Aug. 4, 1936.   E. G. ROEHM   2,049,623
BROACHING MACHINE
Filed Nov. 5, 1934   7 Sheets-Sheet 1

INVENTOR.
ERWIN G. ROEHM
BY
A. H. K. Parsons
ATTORNEY.

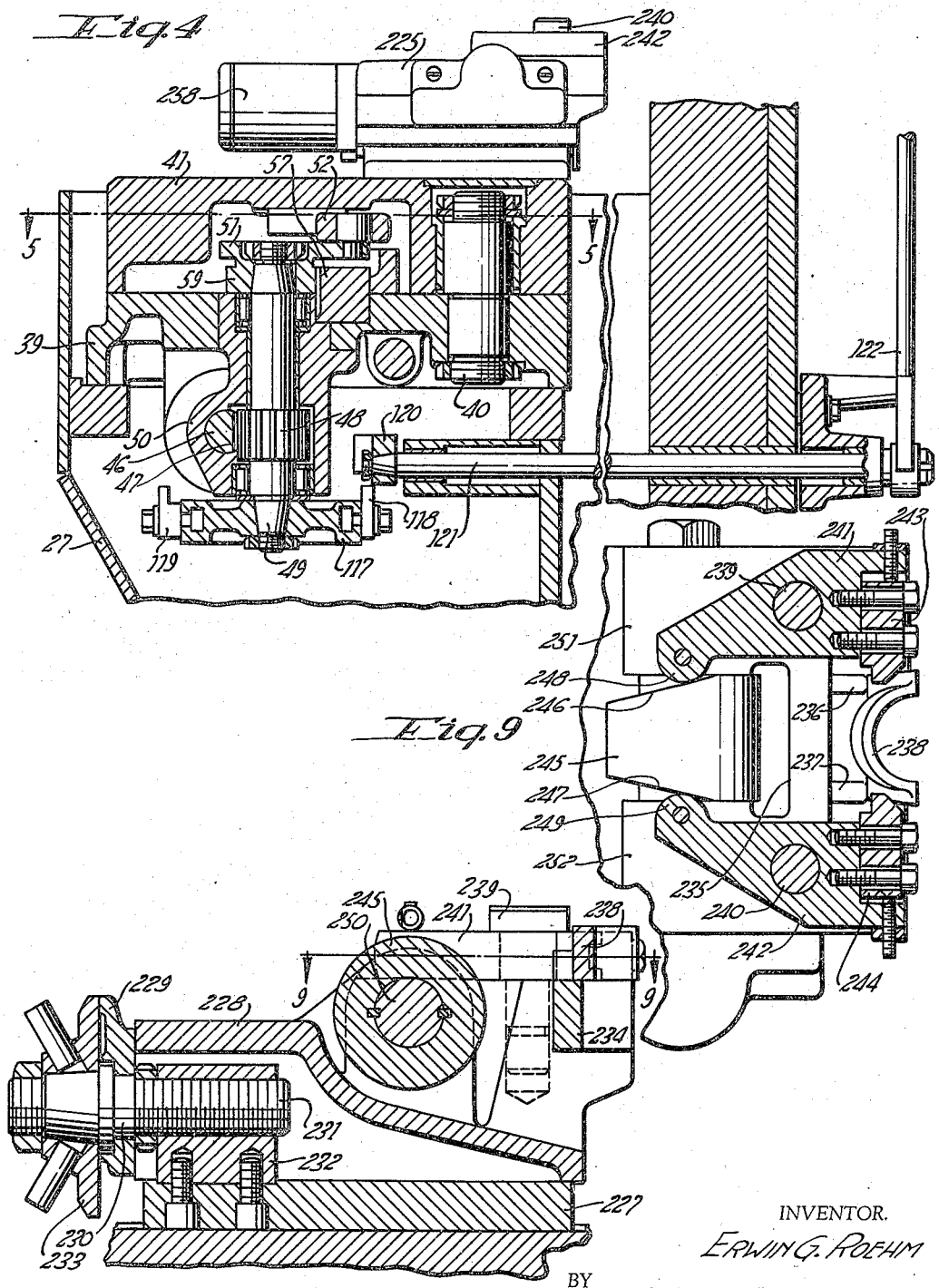

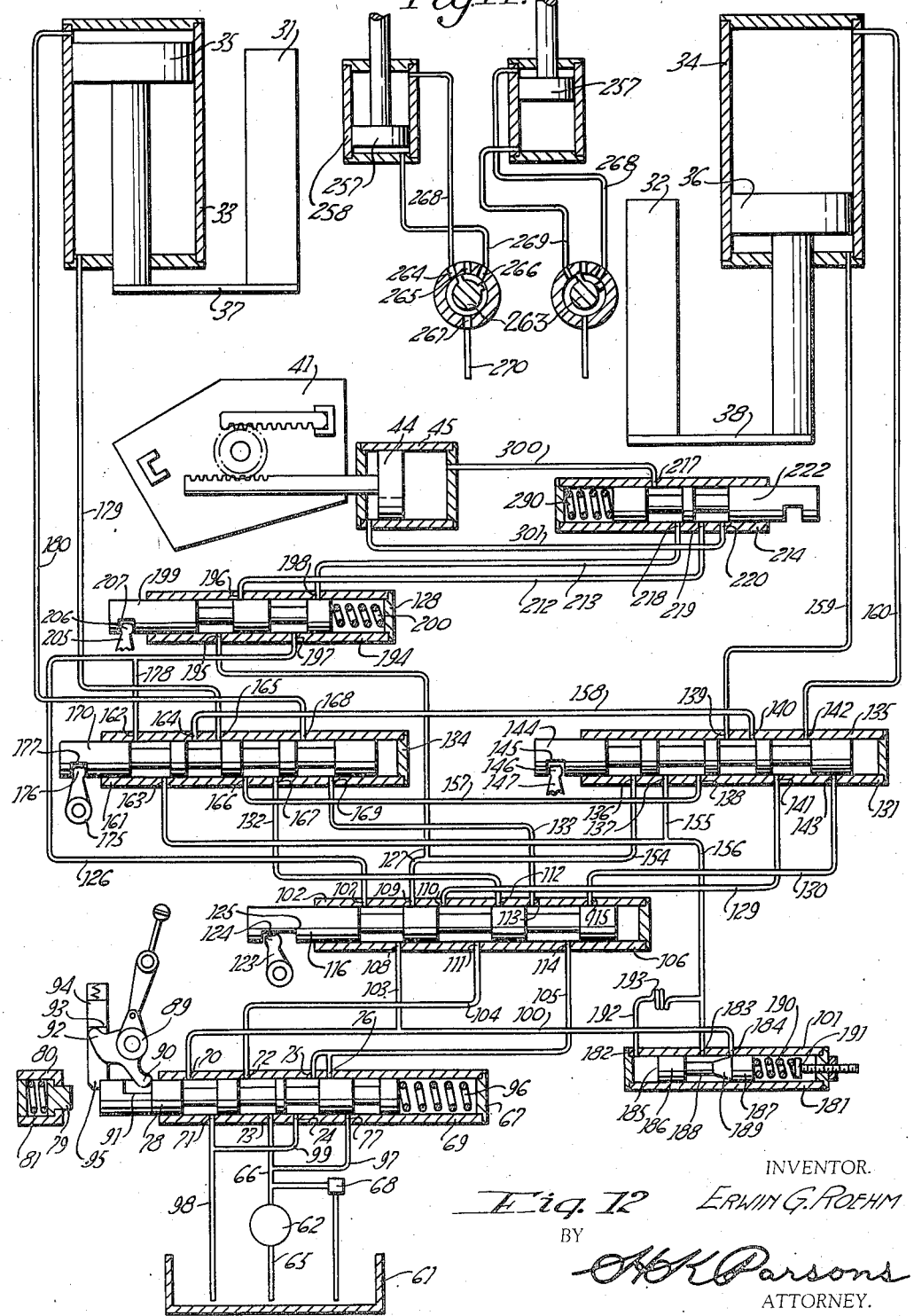

Aug. 4, 1936.  E. G. ROEHM  2,049,623
BROACHING MACHINE
Filed Nov. 5, 1934  7 Sheets-Sheet 6
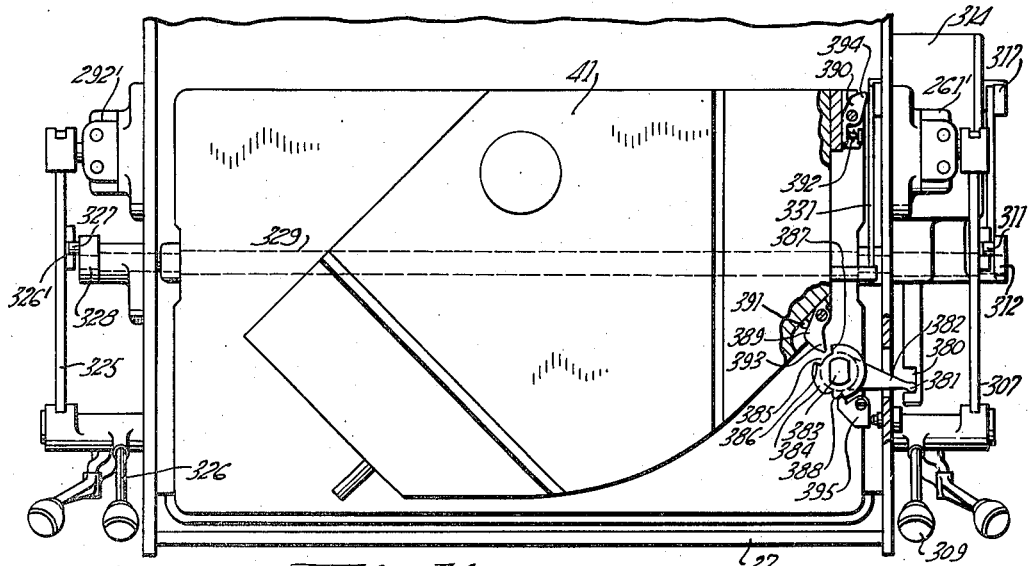
Fig. 13
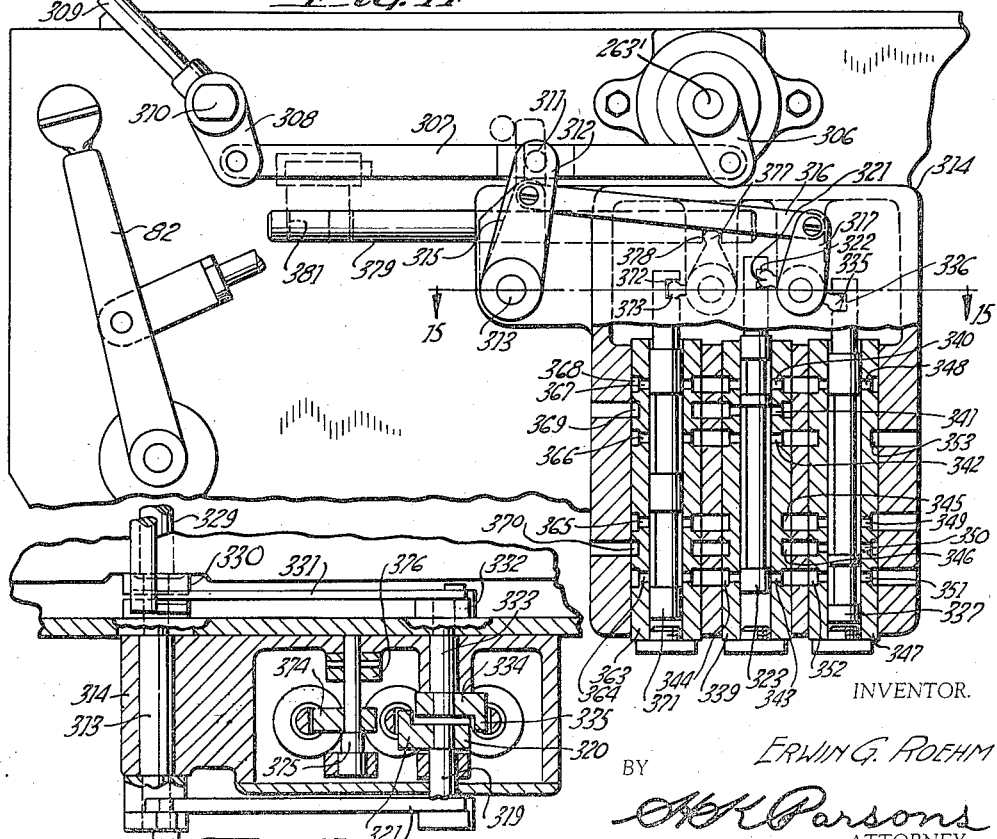
Fig. 14
Fig. 15
INVENTOR.
ERWIN G. ROEHM
BY
A. K. Parsons
ATTORNEY.

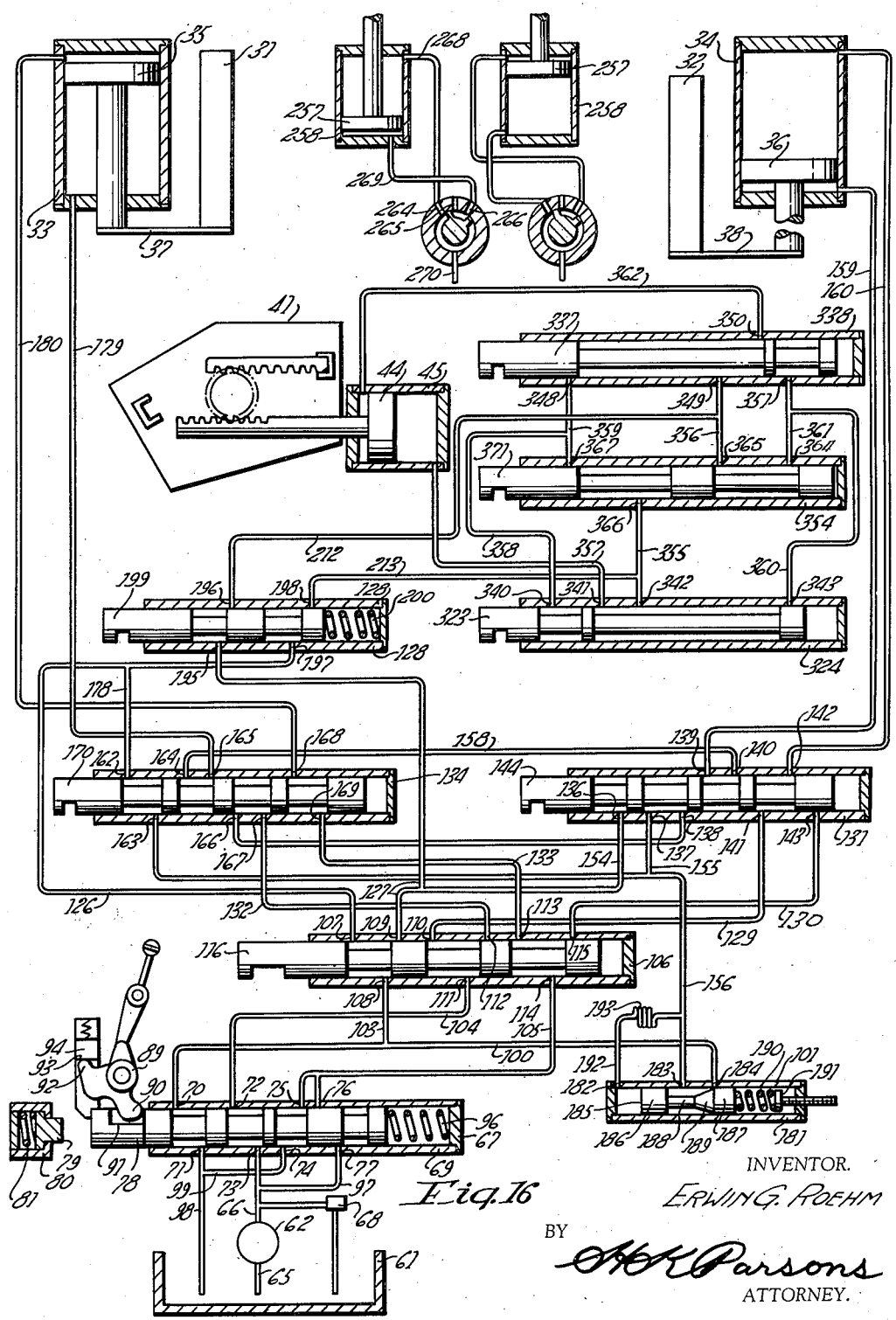

Patented Aug. 4, 1936

2,049,623

UNITED STATES PATENT OFFICE 2,049,623

BROACHING MACHINE

Erwin G. Roehm, Norwood, Ohio, assignor to The Cincinnati Milling Machine Co., Cincinnati, Ohio, a corporation of Ohio Application November 5, 1934, Serial No. 752,829

20 Claims. (Cl. 90—33)

This invention relates to improvements in machine tools and particularly to improvements in broaching machines.

One of the principal objects of this invention is the provision of an improved broaching machine of the multiple or duplex type for continuously producing work pieces which is safe to a maximum degree.

Another object of the invention is the provision of a broaching machine of the type above specified in which the work piece or pieces must be securely clamped before the machine can be set in operation.

A further object of the invention is the provision of an improved hydraulically actuated broaching machine of the duplex type including a work supporting table adapted to support a pair of work fixtures in which the work pieces are to be secured by power means, which power means must be operated in order to effect the operation of the broach ram.

It is also an object of this invention to provide a broaching machine which includes a work support and in which the means for actuating the broach is interconnected with the work support whereby each must be functioning in a normal manner before the other can be operated.

It is also an object of the present invention to provide a broaching machine adapted to be continuously operated but which, if the operator has not finished securing a work piece thereto, will stop at the completion of each cutting cycle.

A still further object of the invention is the provision of a broaching machine which includes a movable work support and in which the work cannot be released from the work support so long as the work support is in position with its work piece adjacent to or in line with the broaching tools.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings:

Figure 4 is a fragmentary vertical sectional view as seen from line 4—4 on Figure 1.

Figure 7 is a staggered horizontal sectional view taken on line 7—7 on Figure 6.

Figure 8 is a longitudinal sectional view through the work supporting fixture as seen for example from line 8—8 on Figure 3.

Figure 9 is a horizontal sectional view as seen from line 9—9 on Figure 8.

Figure 11 is a diagrammatic view of a simple hydraulic circuit as employed with the valve of Figure 10 for operating the work clamping mechanism.

Figure 12 is a diagrammatic view illustrating the various hydraulic circuits and control valves utilized in the operation of the machine.

Figure 13 is a top plan view of the work supporting mechanism and is similar to Figure 3 with the work supporting fixtures removed and illustrating a modification of the invention.

Figure 14 is an enlarged fragmentary elevational view of certain of the parts on the right hand end of Figure 13 and showing the valve lock in section.

Figure 15 is a fragmentary sectional view as seen substantially from line 15—15 on Figure 14.

Figure 16 is a diagrammatic view similar to Figure 12, but including the additional valves and circuits needed in connection with the modification shown in Figures 13 to 15 inclusive.

Throughout the several views of the drawings similar reference characters are employed to denote the same or similar parts.

Figures 1, 6, 10:
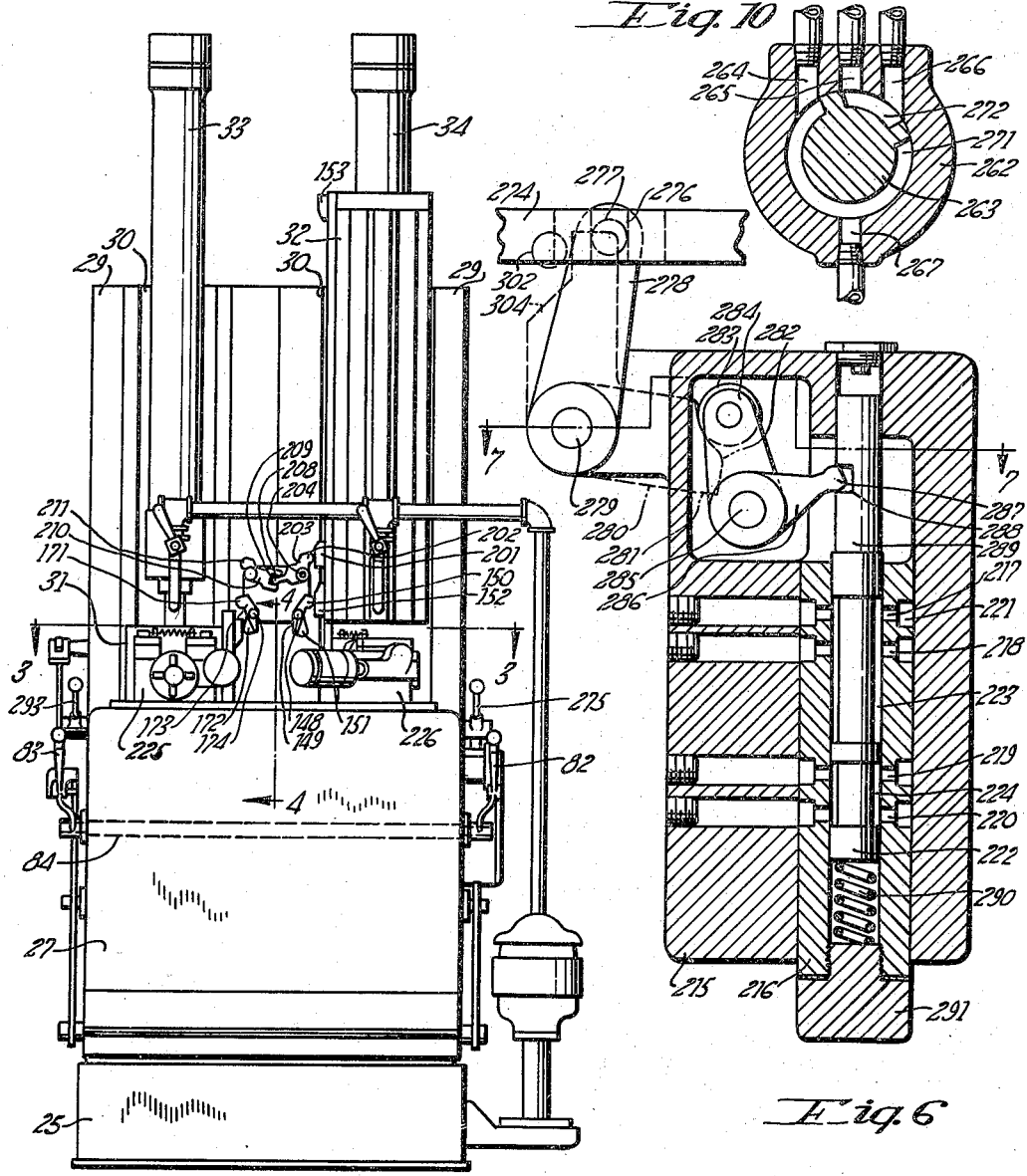
Figure 1 is a front elevation of a broaching machine embodying improvements of this invention.
Figure 6 is a vertical sectional view through the control valve as seen from line 6—6 on Figure 3.
Figure 10 is a sectional view of a form of valve utilized for actuating the work clamping mechanism.

As was noted above, this invention pertains to hydraulically actuated machine tools and particularly hydraulically actuated broaching machines of the duplex type. In this type of machine tool a plurality of work supports are employed whereby one work piece is being operated upon while the other work support is being loaded.

By the present invention the several parts or units of the machine and the work supporting mechanism are interlocked so that the machine or the tool moving elements thereof cannot be operated until the work is securely clamped. Furthermore, by the present invention the work piece that is being operated upon cannot be released until its work support has been retracted a sufficient distance from the tool, thereby preventing the inadvertent loosening of the work while in contact with the tool which would result in either damage to the work or the tool or a wrecking of the machine.

Specifically, the machine of this invention comprises a base 25 which is of hollow construction and utilized as a tank for fluid, preferably oil, as will later appear. Rising from the base 25 is a column 26 to the forward face of which is secured the knee or table support 27. It might be noted at this time that the base column and knee are of fabricated construction, that is, built up from suitable sheets of steel welded to one another. Since this welded construction forms no part of the present invention the details thereof have not been further illustrated or described.

The column 26 is provided with a front plate 28 to which is secured a plurality of bars 29 which between them form a guide way 30 for each of the broaching tool slides or rams 31 and 32. The rams 31 and 32 are substantially U-shaped in cross section thereby providing a hollow space behind each ram which, together with additional space provided by the bar 29, is utilized for the means which actuates the said rams. The means for actuating the rams 31 and 32, as shown in the drawings, comprises a pair of cylinders 33 and 34, each of which respectively encloses a piston 35 and 36, see Figure 12. The piston 35 is connected by a strap or bracket 37 to the slide or ram 31 while the piston 36 is connected by a similar strap or bracket 38 with the slide or ram 32. The means for actuating the pistons 35 and 36 is clearly shown in Figure 12 and will be described in detail later.

Figure 3:
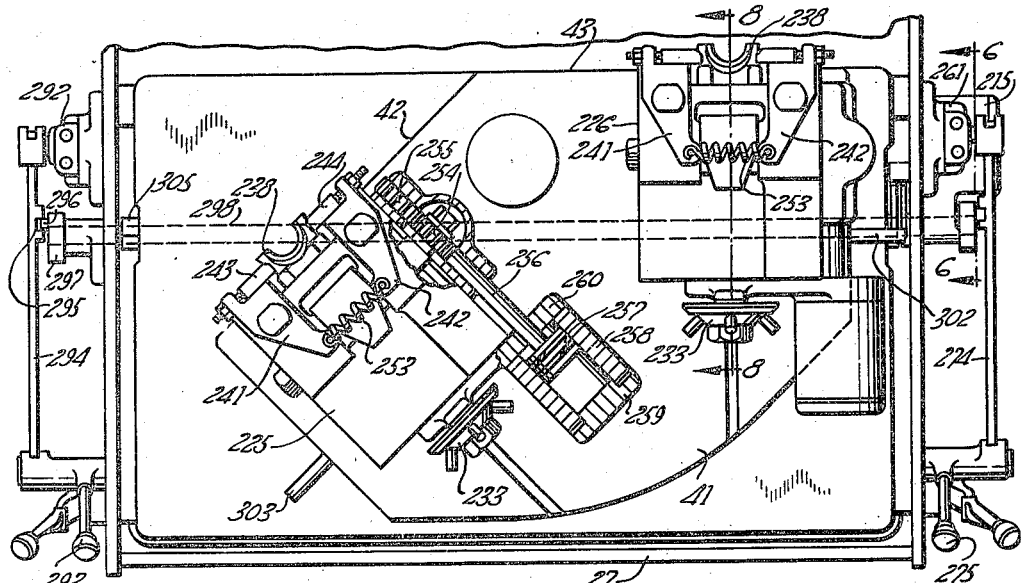
Figure 3 is a fragmentary plan view of the work supporting table as seen from line 3—3 on Figure 1.

The table support or knee 27 has an upper plate 39 which supports the work table and means for actuating it. As shown in Figure 4, the plate 39 has rising therefrom a stud or shaft 40 which constitutes a trunnion for the table 41. As seen in Figure 3, the table 41 is provided on its inner end with a pair of angularly disposed faces 42 and 43 which are adapted to be alternately aligned respectively with the rams 31 and 32 so that work pieces thereon may be tooled or broached.

Figure 5:
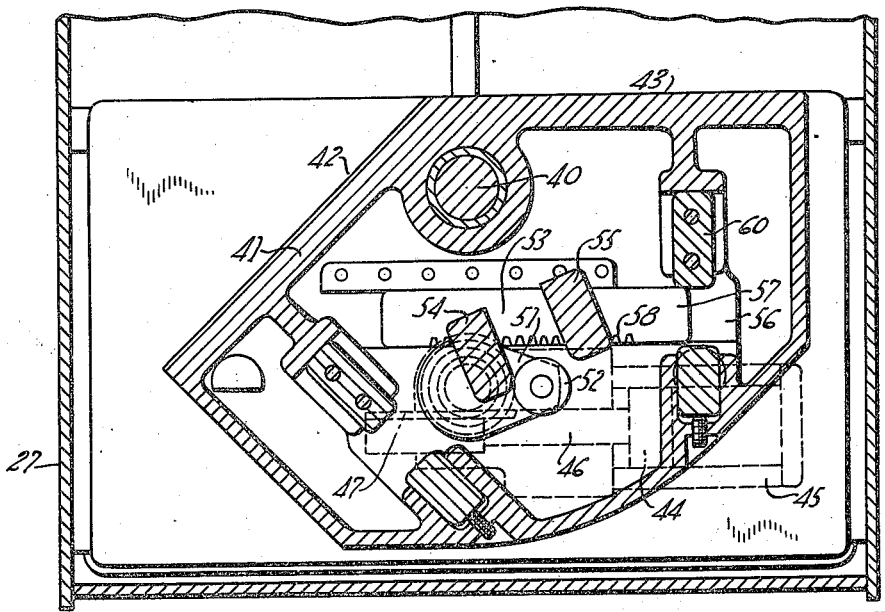
Figure 5 is a horizontal sectional view taken immediately below the work supporting table surface as seen substantially from line 5—5 on Figure 4.

To oscillate the work table use is made of a piston 44 enclosed within a suitable cylinder 45 secured to and depending from the plate 39. The piston 44 is secured to the inner end of a piston rod 46 which is provided near its other end with rack teeth 47. The rack teeth 47 mesh with a suitable rack pinion 48 integral with or secured to a vertically disposed shaft 49 rotatably journaled in a bracket 50 depending from the plate 39. The shaft 49 projects upwardly above the plate 39 to receive an arm 51 most clearly shown in Figure 5. The arm 51 has rotatably mounted thereon a roller 52 which has its axis eccentric to the axis of the shaft 51. The roller 52 is adapted to enter the space 53 provided between a pair of lugs or blocks 54 and 55 secured to the under side of the table 41. From this it will be seen that oscillation of the arm 51, through the roller 52 and blocks 54 and 55, effects the oscillation of the table 41 from one operative position to the other.

In order to clamp the table in its operative position the plate 39, see Figure 4, is provided with a guide way 56 in which is disposed a clamping bar 57. The bar 57 is provided on its forward face with rack teeth 58 adapted to mesh with the teeth of a pinion 59 integral with or secured to the arm 51. From this it will be seen that the bar 57 is axially shifted as the work table is oscillated. The ends of the bar 57 are adapted to enter the space between a clamping block or anvil 60 and the opposed wall of the guide way 56 for thereby accurately positioning the work table and restraining the outward movement of the table due to the cut thrust on the work. It will be understood that there is a separate clamping mechanism at each end of the bar for correspondingly securing the table in position depending upon which of the broach rams 31 or 32 is operating through its cutting stroke.

The means for actuating the broach rams, pistons and the table indexing piston is clearly shown in Figure 12 in diagrammatic form. The mechanism is also shown both in diagrammatic and structural form in co-pending application to Millard Romaine and Erwin G. Roehm, Serial No. 744,552, to which reference may be had for the structural mechanism and particularly the mechanism to actually shift the various valves. The hydraulic circuit, as shown in Figure 12, comprises a sump or tank 61 containing fluid to be circulated through the system, which is preferably oil and the tank is preferably located in the hollow base 25 of the machine. Located above the tank 61 is the pump 62 driven, see Figure 2, by the motor 63 which together with the pump 62 is mounted on a plate 64 and disposed within the column through a suitable opening provided therethrough in the rear thereof. As seen in Figure 12 the pump 62 has connected to one side thereof a suction pipe 65 which terminates in the sump or tank 61. Projecting from the other side of the pump 62 is the pressure pipe or conduit 66 which terminates in a starting, stopping and emergency reverse valve indicated in general in Figure 12 by the reference numeral 67. The pressure pipe or conduit 66 is connected through a by-pass or relief valve 68 with the tank 61 which mechanism, as is usual practice, determines the effective pressure in the pipe or conduit 66 and therefore the operating pressure for the system.

The valve mechanism 67 comprises a valve bushing 69 through which is formed a plurality of ports 70, 71, 72, 73, 74, 75, 76 and 77 to each of which is connected one end of a pipe or conduit as will be later pointed out. Disposed within the bushing 69 is a piston valve member 78 being provided with a plurality of collars or piston portions between which are formed reduced portions or cannelures and adapted to connect the ports in different combinations depending upon the position thereof. The valve member 78 has three operative positions; the running position which is shown in Figure 12, a stopping position which is to the left of that shown in Figure 12 when the end of the valve member contacts with the adjacent end of plug 79 and a reversing position when the said left hand end of the valve member 78 engages the housing 80 of the plug 79 and the spring 81 behind the plug 79 is compressed.

In order to shift the valve to its several positions there is provided a pair of levers 82 and 83 respectively disposed on the right and left hand sides of the machine and respectively secured to the projecting ends of a shaft or rod 84 rotatably journaled in the knee or work support 27. The lever 83 on the left hand side of the machine, as seen in Figure 1, has connected therewith one end of a rod 85, see Figure 2, the other end of which is pivotally connected to a short arm 86 secured to a shaft 87. The shaft 87 is rotatably mounted in a valve block 88 disposed within the column 26 and this block has pressed thereinto the valve bushing 69. Secured to the shaft 87 and adjacent the valve block 88 is a valve shifter 89 having one arm 90 disposed in a notch 91 formed in the valve member 78 and a second arm 92 engaging a shoulder 93 of a spring pressed plunger 94. The plunger 94 is provided on its free end with a nose 95 adapted to engage the valve member 78 and latch same in a running position as shown in Figure 12. The valve member 78 is shifted to its stop position by a spring 96 shown diagrammatically in Figure 12 as being disposed within the valve bushing 69 and abutting on its inner end with the valve member 78 and its outer end with a plug which closes the end of the bushing 69. It is against the resistance of the spring 96 that the plunger or latch 94 retains the valve member 78 when in a running position. The valve member 78 is shifted to the reversing position by either of the handles against the resistance of the spring 81. Upon release of the handle the said spring 81 returns the valve member to its stop position.

As seen in Figure 12, the ports 73 of the valve mechanism 67 has connected therewith the pipe or conduit 66 while the port 77 has connected therewith one end of a branch pressure conduit 97, the other end of which is connected with the pressure pipe or conduit 66. The ports 71 and 74 have respectively connected therewith discharge pipes or conduits 98 and 99 which terminate in the sump or tank 61. The port 79 has connected therewith one end of a pipe or conduit 100 which terminates at its other end in a pressure reducing or relief valve mechanism indicated in general in Figure 12 by the reference numeral 101 and the said pipe or conduit 100 is connected with a second valve mechanism indicated in general in Figure 12 by the reference numeral 102 by means of a pipe or conduit 103. The port 72 has connected therewith a pipe or conduit 104 which terminates in the valve mechanism 102 while the remaining ports 75 and 76 have likewise connected therewith one end of a pipe or conduit 105 which terminates in the valve mechanism 102.

The valve mechanism 102 comprises a valve bushing 106 in which is formed ports 107, 108, 109, 110, 111, 112, 113, 114 and 115. Disposed within the bore in the bushing 106 is a valve member 116 having formed thereon a plurality of piston portions for providing between them reduced portions or cannelures adapted to connect the bushing ports in different combinations. The valve member 116 has two positions, that shown in Figure 12 and a second position to the right thereof. This valve member is shifted by the work table at the end of each oscillation thereof.

The means for shifting the said valve is shown structurally in Figure 4 and comprises a disc 117 secured to the lower end of the shaft 49 for rotation or rather oscillation with the shaft 49. Secured to the periphery of the disc 117 is a pair of dogs 118 and 119 adapted to engage lugs depending from a flipper member 120. The flipper 120 is secured to the inner end of an oscillatable rod 121 rotatably journaled in bearings provided by the column. The rod 121 projects outwardly beyond the rear of the column to which projecting end is secured a lever and link mechanism 122, in turn connected at its upper end to a valve shifter lever 123. The valve shifter lever 123 has its free or ball end 124 received in a notch 125 formed in the valve member 116. For further details of the mechanism for shifting this valve attention is invited to the co-pending application of Millard Romaine and Erwin G. Roehm, above identified; it is sufficient to note that the oscillation of the work supporting table effects the shifting of the valve member 116 at each end of its stroke.

As seen in Figure 12 the valve bushing 106 has respectively connected with its ports 108, 111 and 114 the pipes or conduits 103, 104 and 105. The ports 107 and 109 have respectively connected therewith one end of pipes or conduits 126 and 127 which terminate at their other ends in a safety valve mechanism indicated in general in Figure 12 by the reference numeral 128. The ports 110 and 115 have respectively connected therewith one end of pipes or conduits 129 and 130 which terminate at their other ends in the valve mechanism indicated in general in Figure 12 by the reference numeral 131; this valve mechanism 131 is under the control and operation of the broach slide 32, as will be described later. The remaining ports 112 and 113 have respectively connected therewith one end of pipes or conduits 132 and 133 which terminate at their other ends in a valve mechanism 134 which is similar to the valve mechanism 131 and is under the control and operated by the broach slide 31 as will later be described.

With the valve members 78 and 116 the pressure in the pipe or conduit 66 is connected through the pipe or conduit 104 with the pipe or conduit 129 and the valve mechanism 131. The valve mechanism 131 comprises a valve bushing 135 in which is formed ports 136, 137, 138, 139, 140, 141, 142 and 143. Disposed within the bore in the valve bushing 135 is a piston type valve member 144 being provided with a plurality of piston portions forming between them reduced portions or cannelures adapted to connect the ports in different combinations depending upon the position of the valve.

As was mentioned above, the valve mechanism 131 is operated by the slide 32 and for this purpose the valve member 144 thereof is provided with a transverse notch or groove 145 receiving the ball end 146 of a valve shifting lever 147. The lever 147 is connected through suitable linkage to a rod 148 which projects through the column and beyond the forward face thereof to receive a flipper member 149, see Figure 1. The flipper 149 is provided with a pair of offset lugs 150 and 151 adapted to be respectively actuated by dogs 152 and 153 respectively secured to the slide at the lower and upper ends thereof. This valve shifting mechanism is shown in further detail in the aforementioned co-pending application. It should be noted, however, that the valve member 144 is shifted to the position shown by the dog 152 and to its second position to the right of that shown by the dog 153. As seen in Figure 12, the port 136 has connected therewith one end of a pipe or conduit 154 which has its other end connected to the pipe or conduit 127. The port 137 has connected with it one end of a pipe or conduit 155, the other end of which is connected with a pipe or conduit 156 which extends between the valve mechanisms 101 and 134. The ports 138 and 140 have respectively connected therewith one end of pipes or conduits 157 and 158 which terminate at their other ends in the valve mechanism 134. The ports 141 and 143 have respectively connected therewith the ends of the pipes or conduits 129 and 130 extending from the valve mechanism 102 while the remaining ports 139 and 142 have respectively connected therewith one end of pipes or conduits 159 and 160 which respectively terminate at the lower and upper ends of cylinder 34.

With the valve member 144 in the position shown in Figure 12 the pressure in the pipe or conduits 129 is connected with the pipe or conduit 160 for causing a downward movement of the piston 36 in the cylinder 34. The hydraulic medium on the other side of the piston 36 is exhausted through the pipe or conduit 159 to the valve mechanism 131 where it is connected with the pipe or conduit 158 and the valve mechanism 134.

The valve mechanism 134, as was noted above, is similar to the valve mechanism 131 and comprises a valve bushing 161 through which is formed ports 162, 163, 164, 165, 166, 167, 168 and 169. Disposed within the bore in the bushing 161 is a valve member 170 of the sliding piston type which has provided thereon a plurality of spool or piston portions between which is formed cannelures or reduced portions for connecting the bushing ports in different combinations depending upon the position of the valve member 170.

The valve member 170 is shifted and controlled, as was noted above, by the ram 31, for which purpose the slide 31 has adjustably secured dogs which are similar to the dogs 152 and 153 of the slide 32. These dogs are adapted to respectively engage lugs 171 and 172 projecting in offset relation from a flipper member 173 secured to a shaft or rod 174 oscillatably journaled in the column in a similar manner that rod 148 is mounted. The rod or shaft 174 is adapted to actuate a valve shifting lever 175 which has its ball end 176 received in a transverse notch or groove 177 formed in the valve member 170. This valve shifting mechanism is clearly disclosed in the above mentioned co-pending application to which reference may be had for further details. It will be appreciated, however, that the valve member 170 is actuated by the ram or slide 31.

By reference to Figure 12 it will be noted that the ports 163 and 166 of the bushing 161 have respectively connected therewith one end of the pipe or conduit 156 and 157 which respectively extend from the relief or pressure reducing mechanism 101 and the valve mechanism 131 while the ports 167 and 169 have respectively connected therewith the other ends of the pipes or conduits 132 and 133 which extend from the valve mechanism 102. The port 162 has connected with it one end of a pipe or conduit 178, the other end of which is connected to the pipe or conduit 126 which extends between the safety valve mechanism 128 and the table actuating valve mechanism 102, while the port 164 has connected with it the end of the pipe or conduit 158 which extends from the valve mechanism 131. The remaining bushing ports 165 and 168 have respectively connected therewith one end of a pipe or conduit 179 and 180 which respectively terminate at their other ends in the lower and upper ends of the cylinder 33.

As was noted above, the hydraulic medium exhausted from the cylinder 34 to the valve mechanism 131 is connected with the pipe or conduit 158 with the valve mechanism 134. With the valve member 170 of the valve mechanism 134 in the position shown in Figure 12 the said exhaust is connected with the pipe or conduit 179 and the lower end of cylinder 33 for effecting the upward movement of the piston 35. The medium ahead of the piston 35 is at this time connected through the pipe or conduit 180 to the valve mechanism 134 and through the pipe or conduit 133, valve mechanism 102, pipe or conduit 105, valve mechanism 67 and discharge pipes or conduits 99 and 98 with the sump or tank 61. From the foregoing it will be noted that the piston 36 and slide or ram 32 are now descending and passing through a cutting stroke while the piston 35 and slide or ram 31 is ascending and passing through an idle stroke. These movements of the parts continue until the said rams reach the limits of their movements whereupon the valve members 170 and 144 are shifted to their second or right hand positions as seen in Figure 12. When the said valve members 144 and 170 have been shifted to their second or right position the pressure in the pipe or conduit 129 is cut off from the pipe or conduit 160 and connected with the pipe or conduit 158. It should be noted at this time that if the piston 35 and slide or ram 31 are not at their upper limit of movement the said pressure in the pipe or conduit 158 is connected with the pipe or conduit 179 for continuing the movement of these parts to their final position. As soon as these parts are properly positioned, as mentioned above, the valve member 170 is shifted for connecting the pressure in the pipe or conduit 158 with the pipe or conduit 156 and the pressure reducing or relief valve 101.

As shown in Figure 12 the pressure reducing or relief valve mechanism 101 comprises a bushing 181 in which is formed a plurality of ports 182, 183 and 184. Disposed within the bore in the bushing 181 is a valve member 185 having formed thereon piston portions 186 and 187. Extending from the piston portion 186 is the reduced portion 188, while extending from the piston portion 187 is a conical portion 189 which terminates in the reduced portion 188. The conical portion 189 is utilized to more or less throttle the port 184. Disposed within the bushing 181 is a spring 190 which abuts on one end with the piston portion 187 and on its other end with an adjustable abutment 191 for varying the tension in the spring 190. The port 183 of the bushing 181 has connected therewith the pipe or conduit 156 through which the pressure is now flowing. The port 184 has connected with it the end of the pipe or conduit 100 extending from the valve mechanism 67. The remaining port 182 has connected therewith one end of a pipe or conduit 192 which has its other end connected with the pipe or conduit 156 and the pipe or conduit 192 has therein a hydraulic resistance or choke coil 193.

The operation of this pressure reducing or relief valve is well understood since the pressure in the pipe or conduit 156 flowing through the pipe or conduit 192 and the resistance coil 193 shifts the valve member 185 against the resistance of the spring 190 for opening the port 184 an amount determined by the adjustment of the abutment 191. The opening of the port 184 permits the discharge of a certain quantity of fluid flowing through the pipe or conduit 156 through the pipe or conduit 100 to the valve mechanism 67 and tank or sump 61. The remaining fluid in the pipe or conduit 156 is connected by way of pipe or conduit 155 and the valve mechanism 131 where it is connected with the pipe or conduit 154. Since, and as was mentioned above, the pipe or conduit 154 is connected with the pipe or conduit 127 the pressure is now connected with the safety valve mechanism 128.

This valve mechanism 128 comprises a valve bushing 194 through which is formed a plurality of ports 195, 196, 197 and 198. Disposed within the bore in the bushing 194 is a valve member 199 of the sliding piston type and has formed thereon a plurality of piston portions between which are provided reduced portions or cannelures for connecting the port 195 with the port 196 and the port 197 with the port 198 when in its second operative position, that to the right of the position shown in Figure 12. The valve member 199 is normally in the position shown in Figure 12 and is yieldably shifted to this position by a spring 200 disposed within the valve bushing 194 and abutting on one end with the valve member 199 and on its other end with a plug which closes the bore in the valve bushing.

The valve member 199 is adapted to be shifted to its second operative position by each of the slides or rams 31 and 32 when said slides or rams are respectively in their uppermost position. For this purpose each ram has secured to it a third dog 201. The dog 201 on the slide or ram 32 is adapted to engage a lug 202 projecting from flipper dog 203 secured to an oscillatable rod or shaft 204 journaled in the column and projecting therefrom the rod or shaft 204 is connected through suitable linkage with a valve shifter lever 205 which has its reduced or ball end 206 disposed in a transverse slot or groove 207 formed in the valve member 199. This linkage is clearly shown in the above mentioned co-pending application and since the details thereof form no part of the present invention it should suffice that the ram 32 actuates the valve member 199. In order that the slide or ram 31 can effect the operation of this valve the flipper 203 has projecting from it a tongue 208 which is received in a transverse groove or slot 209 formed in a second flipper dog 210 properly mounted to the face of the column. The second flipper dog 210 has projecting therefrom a lug 211 which is similar to lug 202 and adapted to be engaged by the dog 201 of the slide or ram 31.

Figure 2:
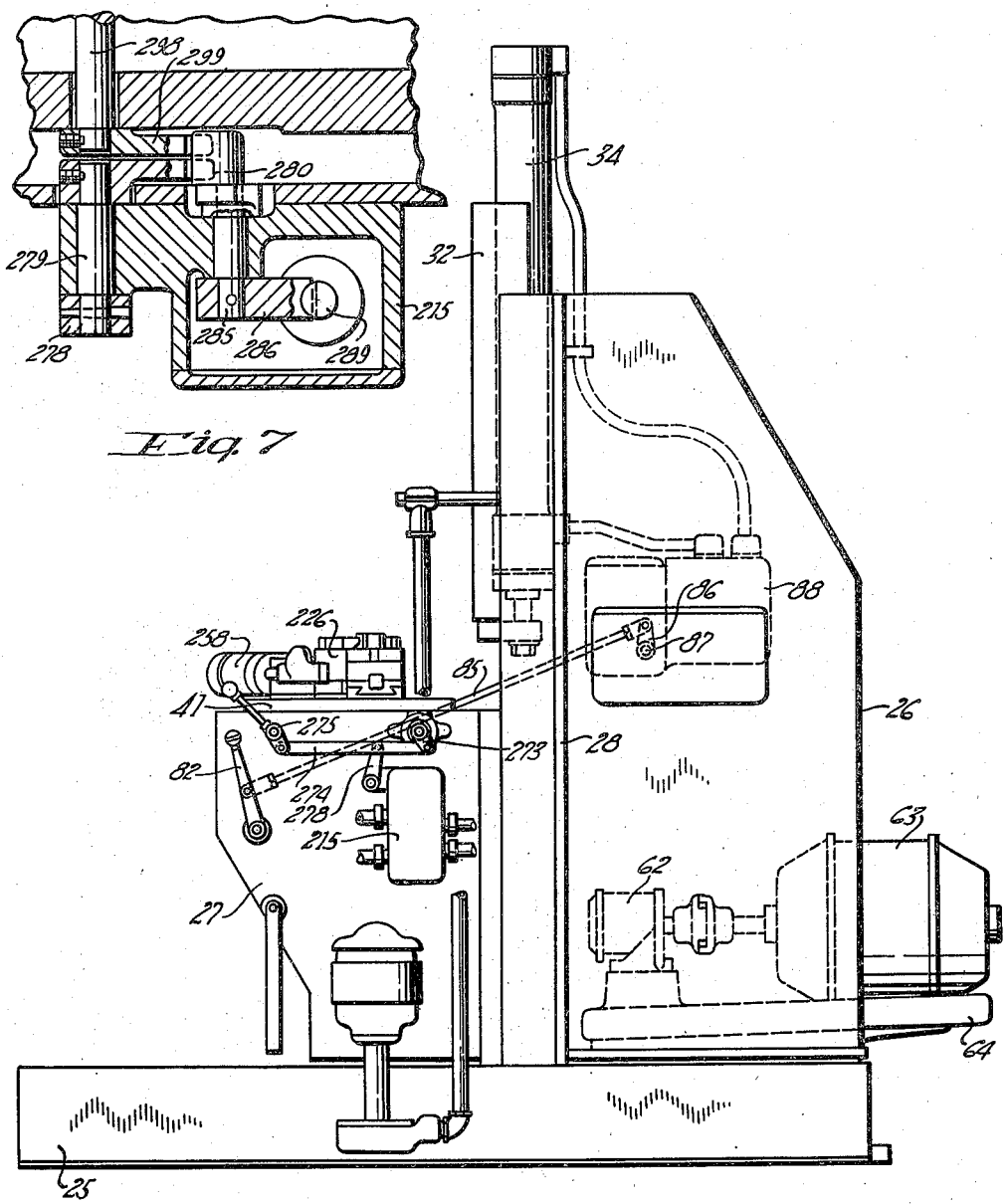
Figure 2 is a side elevation of the machine shown in Figure 1 as seen particularly from the right hand side of Figure 1.

By reference to Figure 12 it will be noted that the pipe or conduit 127 is connected with the port 195 of the bushing 194 while the port 197 has connected therewith the end of the pipe or conduit 126. The remaining ports or conduits 196 and 198 have respectively connected therewith one end of pipes or conduits 212 and 213 which terminate at their other ends in a valve mechanism 214, which valve mechanism is utilized for preventing the operation or indexing of the work table except when the parts are in a desired position. The valve mechanism 214 is shown structurally in Figure 6, and as there shown, comprises a valve casing 215 which is adapted to be secured to the right hand side of the table support or knee 27 as shown in Figure 2. Pressed into a suitable bore in the casing 215 is a valve bushing 216 having formed therethrough a plurality of sets of radial ports 217, 218, 219 and 220, each set of ports being encircled by a similar circumferential groove 221 formed in the exterior of the bushing 216. Disposed within the bore in the bushing 216 is a valve member 222 having formed thereon a plurality of piston portions for providing between them reduced portions or cannelures 223 and 224 adapted to connect ports as shown in Figures 6 and 12 when the valve member is in the said position and when in its second position to cut off the ports 217 and 219 respectively from the ports 218 and 220.

As was mentioned above, this valve mechanism 214 is utilized to prevent the operation of the work table until the parts are in the proper or desired position, that is, the table is prevented from being oscillated unless the unfinished work piece is securely clamped in its work fixture. Before describing the mechanism which actuates the valve member 222 it is desired to describe the work fixture and means for operating the same.

Referring, therefore, to Figures 3, 4, 5, 8 and 9 it will be noted that the work table 41 has secured thereto a pair of work fixtures respectively indicated in general by the reference numerals 225 and 226 and since these fixtures are substantially identical but one of them will be described in detail. Accordingly, and as seen in Figure 8, there is provided a plate 227 supporting on its upper surface for sliding movement relative thereto a carriage 228 to the rear end of which is secured a plate 229. Rotatably carried by the plate 227 is a screw 230 having its threaded end 231 received in a nut 232 secured to the upper surface of the plate 227. The screw 230 projects forwardly of the plate 229 to receive a knob 233 whereby the screw may be rotated. This adjusting mechanism is provided in order to accurately position the fixtures and the work carried thereby relative to rams 31 and 32 and the broach tools carried thereon.

At the forward end of the carriage 228 there is provided a work rest 234 disposed forwardly of a rib or anvil 235 from which projects pins 236 and 237. The anvil 235 through the pins 236 and 237 takes the outward thrust of the broach tools while the rest 234 takes the downward thrust. To secure the work 238, here shown as a connecting rod cap, on the rest 234 the carriage 228 has rising therefrom a pair of pivot pins 239 and 240 on which are respectively journaled arms 241 and 242. Secured to the outer ends of the arms 241 and 242 are respectively clamping jaws 243 and 244 adapted to be adjustably secured by suitable adjusting screws and clamp bolts shown in Figure 9. The arms 241 and 242 are actuated about their pivot pins by means of a rotatable cam 245 having cam sides 246 and 247 which respectively engage lugs 248 and 249 projecting from the arms 241 and 242. In order to hold the arm lugs 248 and 249 in contact with their cam faces 246 and 247 the said arms have each connected therewith offset ends of a spring 253. The cam 245 is keyed or otherwise secured to an oscillatable shaft 250 journaled in bosses 251 and 252 rising from the upper surface of the carriage 228.

In order to rotate or oscillate the shaft 250 the said shaft projects beyond the carriage 228 to which projecting end is keyed or otherwise secured a rack pinion 254 meshing with rack teeth 255 formed on a piston rod 256, see Figure 3. The piston rod 256 has secured thereto a piston 257 which is enclosed in a suitable cylinder 258. The cylinder 258 is closed at opposite ends by heads 259 and 260, the latter of which may be formed integral with the carriage plate 229.

From the foregoing it will be noted that each work fixture is power actuated to securely clamp work pieces therein. While the work piece shown in the drawings is a connecting rod cap it should be noted that the mechanism is not to be limited to this type of work piece as the invention will operate with equal facility on all types and kinds of work pieces.

The piston 257 is adapted to be either hydraulically or pneumatically actuated, it being shown in the drawings as operated by air pressure. In order to connect the pressure with alternate ends of the cylinder there is provided a valve mechanism indicated in general in the drawings by reference numeral 261 which, as shown in Figure 10, comprises a housing or casing 262 having an oscillatable plug valve member 263 therein. The casing 262 is provided with ports 264, 265, 266 and 267. The ports 264 and 266, as shown in Figure 11, have respectively connected therewith one end of pipes or conduits 268 and 269 respectively terminating at the inner and outer ends of the work clamping cylinder. The port 265 is open to atmosphere while the port 267 has connected therewith one end of a pressure pipe or conduit 270. In order to alternately connect the pipes 268 and 269 to pressure and to atmosphere the plug valve member 263 is provided with passages 271 and 272 adapted to be alternately connected with the pressure pipe 270 and atmosphere.

Each of the work clamping cylinders has connected with it its own control valve and their respective plug valve members 263 project beyond the casing. The said valves are respectively secured to the outer surface of their adjacent side walls of the table support or knee 27. To the projecting end of the valve member for work fixture 226 is secured an arm 273 pivotally connected to one end of a link 274 which has its other end pivotally connected to a lever 275, in turn pivotally mounted on the right hand side of the table support or knee 27.

From the foregoing it will be seen that oscillation of the handle 275 oscillates the valve plug member 263 for the right hand fixture to initiate the movement of the clamping piston to release the work and subsequently clamp an unfinished work piece. From Figure 2 it will be seen that the handle 275 is actuated in a clockwise direction or rearwardly to open the work fixture and in an opposite direction to clamp the fixture. As was noted above, there is provided the valve mechanism 214 which prohibits the oscillation of operation of the work table once the work fixture to be next operated upon is in proper clamped condition. For this reason the valve member 222 is actuated simultaneously with the operation of the work clamping valve 263. The link 274 is therefore provided intermediate its ends with a vertical groove or slot 276 receiving therein a pin 277 projecting laterally from the free end of an arm 278. The arm 278 is pinned or otherwise secured to a stud 279 rotatably or oscillatably journaled in a suitable bore formed in a bracket integral with the valve casing 215. The stud 279 projects through the right hand wall of the knee 27 and to said projecting end is pinned or otherwise secured an arm 280. The arm 280 has its inner or free end 281 cam-shaped and provided with the cam portion 282, see Figure 6. Lying adjacent to and contacting the said free or cam-shaped ends of the arm 280 is a roller 283 rotatably secured to the upper end of an arm 284, the arm 284 being in turn pinned or otherwise secured to a short shaft or stud 285 oscillatably mounted in a bearing provided by the valve housing 215. As seen in Figure 7 the shaft or stud 285 projects into the interior of the valve housing 215 and has pinned to the said projecting end a lever 286 with its ball end 287 disposed in a transverse notch or slot 288 formed in the valve stem 289 of valve member 222.

From the foregoing it will be noted, with particular reference to Figures 2 and 6, that operation of the handle 275 in a clockwise direction or rearwardly causes the link 274 to be shifted to the left, thereby actuating the arms 278 and 280 in a counterclockwise direction. This movement of the arm 280 through the arm 284 and lever 286 effects a downward movement of the valve member 222 for cutting off ports 217 and 219 respectively from the ports 218 and 220. This would, of course, interrupt any flow between the said ports and pipes connected therewith as will later be made clear and it should be noted that with the valve member 222 in this position the indexing mechanism for the work supporting table is cut off. The movement of the valve member 222 as just described is against the yielding resistance of a spring 290 disposed in the lower end of the valve bushing 216, the spring 290 abutting on one end with the valve member 222 and on its other end with a plug 291 which closes the end of the bushing bore. The spring 290 effectively maintains contact between the roller 283 and the end of the arm 280.

The foregoing description deals with the operation of the valve member 222 when the clamping valve mechanism associated with the right hand fixture 226, as seen in Figure 3, is operated. As was noted above, the valve member 222 is actuated simultaneously when the other fixture is operated and for this purpose the valve mechanism indicated in general in Figure 3 by the reference numeral 292 for the work fixture 225 has its plug valve member connected with a handle 293 which is identical with the handle 275 by way of a link 294 which is substantially identical with the link 274. The link 294 is provided with a groove or slot 295 receiving a pin 296 eccentrically disposed to and carried by a disc 297 which is secured to a shaft 298 extending substantially entirely across the work support or knee 27. The shaft 298 stops short of the inner surface of the right hand wall of the knee and is in axial alignment with the stud 279, see Figure 7. Secured to the end of the shaft 298 adjacent the arm 284 is an arm 299 which is similar in contour to the arm 280 and is provided at its free end with a cam portion which is similar in all respects to the cam portion 282 of the arm 280. The said cam portion of the arm 299 is adapted to engage the roller 283 of the arm 284, the said roller being of a width equal to the combined width of the arms 280 and 299 as seen in Figure 7. From the foregoing it will be seen that the operation of the work clamping and releasing handle 293 on the left hand side of the work support or knee 27 through the linkage just described and arm 299 effects the operation of the valve member 222 in the same manner as above described in connection with the work clamping and releasing handle 275.

By reference to Figure 12, it will be noted that the ports 218 and 219 of the valve bushing 216 has respectively connected therewith the other ends of the pipes 212 and 213 which extend from the valve mechanism 128. The remaining ports 217 and 220 have respectively connected therewith the ends of pipes or conduits 300 and 301 which respectively terminate at their other ends in the forward and rear ends of the work table indexing cylinder 45.

As was mentioned above, this machine embodies means whereby the work fixture whose work piece is being tooled cannot be unclamped until the work supporting table has been oscillated or backed away from the tool a certain predetermined distance to clear the work of the tool. This means, as shown in the drawings, comprises a pair of pins 302 and 303 projecting respectively from the sides of the table 41 which is adjacent the work clamping fixtures 226 and 227. With the table 41 in the position shown in Figure 3 the pin 302 lies behind an arm or finger 304, pinned or otherwise secured to the shaft 279 which for convenience is a part of the arm 280. By reference to Figure 3 it will, therefore, be noted that with the table as there shown a movement of the handle 293 outwardly in order to release the clamped work piece would require the moving of the table thereby. Since this would be impossible the fixture cannot be operated until the table has indexed sufficiently to retract the work from the line of movement of the tool.

The pin 303 on the other side of the table 41 cooperates with a finger or lever 305 which is pinned or otherwise secured to the shaft 298, and similarly the finger 304 physically resists the operation of the valve mechanism 292 when the work in the fixture 225 is being operated upon.

The operation of the machine is as follows:

With the valves in the position shown in Figure 12 the work slide or ram 32 is descending because the pressure developed by the pump 62 is connected with the upper side of its piston through the following circuit. Pressure from the pump 62 is discharged through the pipe or conduit 66, valve mechanism 67, pipe or conduit 104, valve mechanism 102, pipe or conduit 129, valve mechanism 131 and pipe or conduit 160. The slide or ram 31 is at this time ascending which is effected by the exhaust from the cylinder 34 through the following circuit. The exhaust from the cylinder 34 is through the pipe or conduit 159, valve mechanism 131, pipe or conduit 158, valve mechanism 134 and pipe or conduit 179 to the lower end of the cylinder 33 and the under side of the piston 35. This exhaust medium has sufficient pressure to elevate the piston 35 and the upper end of the cylinder is connected with the sump or tank through the following circuit. The exhaust from the said cylinder 33 is by way of pipe or conduit 180, valve mechanism 134, pipe or conduit 133, valve mechanism 102, pipe or conduit 105, valve mechanism 67 and discharge pipes or conduits 99 and 98 to the sump 61. The rams 31 and 32 continue to move as just described until they each reach the respective ends of their travels, that is, the ram 32 its lowermost position while the ram 31 its uppermost position.

As soon as the rams have been respectively positioned the valve members of valve mechanisms 134, 135 and 128 are shifted and each assumes a position to the right of that shown in Figure 12. At this time the pressure in the pipe or conduit 129 is connected with the pipe or conduit 158 through the valve mechanism 131 to the valve mechanism 134 where the said pressure is connected with the pipe or conduit 156 and the valve mechanism 101. The said pressure upon flowing through the pipe or conduit 192 positions the valve member of the valve mechanism 101 to reduce the flow and therefore the pressure in the pipe or conduit 156.

The excess fluid or flow in the pipe or conduit 156 is connected with the pipe or conduit 100 by way of the valve mechanism 101 to the valve mechanism 67 where it is directed to the pipe or conduit 98 and therefore the sump 61. The remaining flow and pressure in the pipe or conduit 156 is connected with the valve mechanism 131 by way of pipe or conduit 155 and is connected by said valve with conduits 154 and 127 and valve mechanism 128. At this time the flow in the pipe or conduit 127 is connected with the pipe or conduit 212, valve mechanism 214, pipe or conduit 301 and cylinder 45 for actuating the piston 44 and thereby indexing the table. The medium behind the piston 44 is exhausted through the pipe or conduit 300, valve mechanism 214, pipe or conduit 213, valve mechanism 128, pipe or conduit 126, valve mechanism 106, pipes or conduits 103 and 100, valve mechanism 67 and pipe or conduit 98 to the sump or tank 61.

As soon as the table is fully indexed the valve member 116 of valve mechanism 102 is shifted to its second or right hand position, thereby reversing the circuits above described to the broach cylinders 33 and 34 for reversing the flow therein and effecting the downward movement of the ram 31 and upward movement of the ram 32. During this movement the work fixture 225 is operated to release the finished work piece therein and to secure in position an unfinished work piece. As was fully described above, this operation shifts the valve member 222 of the valve mechanism 214, thereby preventing any flow through the pipes or conduits 212 and 213. Should the rams 31 and 32 reach the ends of the movements they are effecting before the operator gets the unfinished work piece properly clamped and the valve members of valve mechanisms 131, 134 and 128 shifted to their proper positions, the machine would cease to operate until the work clamping is completed. As soon as the work clamping is completed and the valve mecahnism 214 positioned as shown in Figure 12 the table would then index and the machine continue to operate. From this it will be seen that there has been provided a mechanism in which the work must be properly clamped in its fixture at the completion of each cycle of the machine or the machine will automatically stop until the clamping of the work is completed.

It will also be noted, as particularly described above, that the work table cannot be indexed until the cutting stroke of either ram is completed due to the physical interference of the table pins 302 and 303 to the shifting of the work fixture clamping valves.

The modification shown in Figures 13 to 16 inclusive discloses a mechanism for accomplishing substantially the same function as the mechanism previously described except that the oscillation or indexing of the table may be initiated whether the work piece is clamped or not, but the said indexing of the table will be stopped before the work is in line with the broaching tool and therefore the rams will be held against operation until the work is fully clamped, whereupon the indexing of the table is completed and the movement of the rams initiated. Additionally, with the modified structure the finished work piece may be released from its fixture shortly after the retraction thereof from the broach tool, thereby cutting down the idle time of the machine and affording the operator a greater period of time in which to release a finished work piece and clamp an unfinished work piece. These additional functions are provided by a different arrangement of the valves operated by the work fixtures and by the oscillation of the table, as will now be described in detail.

Specifically, each work fixture is provided with a control valve identical with those above referred to and indicated in Figure 13 by the reference characters 261' and 292'. The valve mechanism 261' has the plug valve member 263' projecting therefrom to which is secured one end of an arm 306 to the free end of which is secured one end of a link 307 extending along the right hand side of the table support or knee 27. The other end of the link 307 is connected with one end of an arm 308 extending from the clamping lever 309 pivoted at 310 to the side of the knee. The link 307 is provided intermediate its ends with a transverse slot receiving therein a pin 311 projecting from the upper end of an arm 312. The arm 312 is pinned or otherwise secured to a shaft 313 rotatably mounted in a bearing provided by the valve casing 314. The shaft 313 has additionally keyed or otherwise secured thereto a second arm 315 having pivotally connected to its free end a link 316. The link 316 is in turn pivotally connected to a lever 317 which is secured to a stud 319 oscillatably mounted in the valve casing 314. Within the said valve casing 314 the stud 319 carries a valve shifter lever 320 having its reduced or ball end 321 received in a slot 322 formed in a valve member 323 of a valve mechanism indicated in general in Figure 16 by the reference numeral 324. From the foregoing it will be noted that the operation of the valve mechanism 261' effects the operation of the valve mechanism 324.

The valve mechanism 292', similar to the valve mechanism 261', has its plug valve member projecting therefrom. The said plug valve member has connected therewith one end of a link 325, the other end of which is connected to the clamping handle 326, which construction is similar to that described in connection with handle 309. Intermediate its length the link 325 is provided with a transverse slot 326 receiving therein a pin 327 projecting from one end of an arm 328 which is similar to the arm 312. The arm 328 is secured to one end of a shaft 329, rotatably journaled in suitable bearings provided by the table support or knee 27 and extending entirely across the said support. To the other end of the shaft 329 is secured a lever 330 having pivotally connected to its free end one end of a link 331 which is similar to the link 316. The other end of the link 331 is pivotally connected to an arm 332, in turn secured to a stud 333 rotatably or oscillatably mounted in a bearing provided by the valve casing 314. The stud 333 is in axial alignment with the stud 319 and the said stud 333 has keyed or otherwise secured to it a valve shifter lever 334 which has its reduced or ball end 335 received in a notch 336 formed in the stem of a valve member 337. The valve member 337 is associated with a valve mechanism indicated in general in Figure 16 by the reference numeral 338. From the foregoing it will now be seen that operation of the handle 326 for actuating the valve mechanism 292' simultaneously shifts a second valve mechanism, the purpose of which will be described in detail later.

The valve mechanism 324, as seen in Figure 14, comprises a valve bushing 339 pressed into a suitable bore in the valve casing 314. The valve bushing has formed therethrough a plurality of sets of radial ports 340, 341, 342 and 343, each set of ports being encircled by a similar circumferential groove 344 formed in the exterior of the bushing 339. The bushing 339 is additionally provided with circumferential grooves 345 and 346 which provide a passage around the bushing to act as conduits for the medium as will be seen in diagrammatic form in Figure 16. The valve member 323 is provided with a plurality of piston portions forming between them reduced portions or cannelures adapted to connect the several sets of radial ports depending upon the position of the valve member. The valve member is shifted to its operative positions by the handle 309 through the mechanism above described and these positions are first as shown in Figure 14 and second a position below the one shown.

The valve mechanism 338 is shown structurally in Figure 14, and is similar to the valve mechanism 324 and comprises a bushing 347 pressed into a suitable bore in the valve casing 314. The bushing 347 is provided therethrough with a plurality of sets of radial ports 348, 349, 350 and 351, each set of ports being encircled by similar circumferential grooves 352 formed in the exterior of the bushing 347. This bushing 347 is additionally provided with a circumferential groove 353 for providing a conduit or passage around the valve mechanism 338.

The hydraulic circuit shown in Figure 16 in the main and up to the valve mechanism 128 is substantially identical to the valve mechanism shown in Figure 12 and from there on the circuit is different to accommodate the valve mechanisms 324 and 338 and a valve mechanism indicated in general in Figure 16 by the reference character 354. The pipes or conduits 212 and 213 which extend from the valve mechanism 128 instead of connecting with the valve mechanism 214 respectively connect with pipes or conduits 355 and 356. The pipe or conduit 355 extends between the valve mechanism 324 and 354 while the pipe or conduit 356 extends between the valve mechanism 354 and 338. As seen in Figure 16, the pipe or conduit 355 connects with the port 342 of the valve mechanism 324. The ports 341 have connected therewith one end of a pipe or conduit 357 which terminates at its other end in the rear end of work table indexing cylinder 45, while the ports 340 have connected therewith one end of a pipe or conduit 358 which terminates at its other end in a pipe or conduit 359. The remaining ports 343 of the valve mechanism 324 have connected therewith one end of a pipe or conduit 360, the other end of which is connected with a pipe or conduit 361.

The valve mechanism 338, as shown in Figure 16, has respectively connected with its ports 348 and 351 the other ends of the pipes or conduits 359 and 361, while the port 349 has connected therewith the pipe or conduit 356. The remaining port 350 of the valve mechanism 338 has connected therewith one end of pipe or conduit 362 which terminates at its other end in the forward end of table oscillating cylinder 45. The valve mechanism 354 is shown structurally in Figure 14 and comprises a valve bushing 363 through which is formed a plurality of sets of radial ports 364, 365, 366 and 367, each set of ports being encircled by a similar circumferential groove 368. In addition, the bushing 363 is provided with a pair of circumferential grooves 369 and 370 which act as conduits for the medium in by-passing the fluid through the valve block 314. Disposed within the bore in the valve bushing 363 is a piston valve member 371 provided with a plurality of piston portions forming reduced portions or cannelures between them for connecting the sets of radial ports through the valve bushing in different combinations.

In order to shift the valve member 371 it has extending therefrom a stem in which is formed a transverse groove or slot 372 receiving the ball end 373 of a valve shifter lever 374. The valve shifter lever 374 is pinned or otherwise secured to a shaft 375 oscillatably or rotatably mounted in suitable bearings provided by the valve casing 314. Additionally pinned or otherwise secured to the shaft 375 is an arm 376 having its reduced or ball end 377 received in a groove or slot 378 formed in one end of a rod 379. The rod 379 is mounted in suitable bearings for sliding movement relative thereto provided by the valve casing 314 and is further provided at its outer end with a slot or groove 380. Received in the slot or groove 380 is the reduced or ball end 381 of an arm 382 secured to a pivot pin 383 oscillatably journaled in the table supporting plate 39. The pivot pin 383 has further keyed or otherwise secured thereto a plate 384 having formed in its periphery a slot 385 to provide shoulders 386 and 387. The plate 384 is additionally provided with a pair of V notches, the adjacent sides of which terminate at the apex of a conical point 388.

Secured to the table 41 is a pair of dogs 389 and 390 respectively pivotally mounted for oscillation in a clockwise and a counterclockwise direction. The said dogs are respectively actuated in the directions above indicated by spring loaded plungers 391 and 392 which normally hold said dogs in a position to provide a non-yielding dog point 393 and 394 which are adapted to respectively engage the shoulders 386 and 387 on the plate 384 for effecting its operation or oscillation. Cooperating with the V notches and conical lug 388 of the plate 384 is a pivotally mounted spring loaded dog 395 which in effect provides a spring loaded firing dog.

By reference to Figure 13 it will be noted that oscillation of the work table 41 in a clockwise direction will cause the dog point 393 to engage the shoulder 386 and oscillate the plate 384. This movement of the plate carries with it the arm or lever 382 causing the free end 381 to take up the lost motion in the slot 380 and the load and fire dog 395 to ride up to the apex of the conical lug 388 of the plate 384. Substantially at the time the lost motion in the slot 380 is taken up the load and fire dog 395 is at the apex of the lug 388, whereupon the spring plunger causes the said dog to descend from the said apex and shift the lever 382 and therefore the rod 379, which through the levers 376 and 374 actuates the valve member 371.

By reference to Figure 16 it will be noted that the ports 367, 366, 365 and 364 of the valve mechanism 354 have respectively connected therewith the pipes or conduits 359, 355, 356 and 361.

The operation of the modified construction involving valve mechanisms 324, 338 and 354 is as follows: With the valve members of the said valve mechanisms in the positions shown and assuming that the table safety valve mechanism 128 has been thrown to connect the hydraulic pressure through said valve mechanism with the pipe or conduit 212 the flow of the medium will be as follows: Through the pipe or conduit 212 and the pipe or conduit 356, valve mechanism 338 and pipe or conduit 362 to the left hand end of the table cylinder 45. This causes the table to be oscillated in a counterclockwise direction and the medium behind the piston 44 is exhausted from the cylinder 45 through the pipe or conduit 357 to the valve mechanism 324, pipe or conduit 355 and pipe or conduit 213 to the valve mechanism 128 where it is connected with the sump or tank through the circuit above described.

The foregoing description deals with the hydraulic circuit with the valves in the position shown. Assuming now that the valve mechanism 338 is not in the position shown but in the position with the valve member to the left of the position shown and the work piece therefore unclamped, under these circumstances the table will oscillate a certain amount and the flow will be as follows: From the pipe or conduit 212 to the pipe or conduit 356 into the valve mechanism 338 and valve mechanism 354 simultaneously. The flow from the valve mechanism 338 is at this time cut off from the flow in the pipe or conduit 356 so that the flow will therefore be from this pipe or conduit 356 into the valve mechanism 354. The flow from the valve mechanism 354 is by way of pipe or conduit 361 to the valve mechanism 338 whereupon it is connected with the pipe or conduit 362 and the cylinder 45. This, of course, effects the operation of the piston 44 therein for initiating the indexing of the work supporting table. As soon as the table has indexed a small amount the valve member of the valve mechanism 354 is shifted, thereby cutting off the flow between the said valve mechanism 354 and pipe or conduit 361 and stopping the movement of the piston 44 and therefore the table until the work is clamped and the valve mechanism 338 properly actuated. From this it will be seen that the work table's oscillation may be initiated whether the work is securely clamped in position or not.

Due to this interconnection of the valves the valve mechanism 324 may be actuated upon the releasing or unclamping of the finished work piece without interfering with the flow of the fluid through the system. This will be appreciated from Figure 16 because the valve mechanism 338 is connected directly with the valve mechanism 354 and by-passes the other valve mechanism 324, while the valve mechanism 324 is likewise directly connected with the valve mechanism 354 and by-passes the valve mechanism 338. The operation of the parts for indexing to the right is substantially the same as that just described except that the pressure at this time is flowing through the pipe or conduit 213 instead of the pipe or conduit 212.

It should be noted that while the various connections between the ports, and particularly 355, 356, 359 and 361, have been described as pipes or conduits these may be, and in effect are, merely interdrilled ports in the main valve block as described in detail above in connection with Figure 14.

What is claimed is:

1. In a duplex broach of the class described the combination with a pair of reciprocating broach rams, of hydraulic means for effecting the operation of said rams, an oscillatable work supporting table adapted to have secured thereto a pair of work pieces, means for oscillating the table for alternately presenting a work piece to the broach rams, power actuated means for securing work pieces to a table, control means therefor and valve means operable to stop the operation of the rams when the control means are in work releasing position.

2. In a broaching machine of the class described the combination of a pair of broach rams adapted to be alternately actuated through a cutting and an idle stroke, an oscillatable table, means for securing a pair of work pieces to the table for alternate presentation to the broach rams when traveling through their cutting strokes, a hydraulic circuit for actuating the broach rams, means for securing the work pieces to the table, and a valve operable by the work securing means to interrupt the operation of the hydraulic circuit when the securing means are in releasing position.

3. In a broaching machine of the class described the combination of a pair of reciprocating rams, an oscillatable table adapted to support a pair of work pieces and operable for presenting one piece to one ram and the second piece to the other ram, a work fixture for each work piece on the table, independent means for actuating the work fixtures to release the finished work piece in one fixture and secure an unfinished work piece therein, and means operable with said last mentioned means to stop the tooling movement of the ram unless the work piece fixture therefor is actuated into work securing position.

4. In a broaching machine of the class described the combination of a pair of broach rams, means for effecting a continuous cyclic movement of said rams through a cutting and an idle stroke, an oscillatable work supporting table for supporting a work piece for each ram and operable at the conclusion of each cycle of operation of the rams, means for securing each work piece to the oscillatable work table, and means operable with the last mentioned means for automatically stopping the cyclic operation of the rams, when the securing means are in releasing position.

5. In a broaching machine of the class described the combination of a first ram, a second ram, means for simultaneously actuating said rams, one through a cutting stroke while the other is being actuated through an idle stroke, hydraulic means for effecting the cyclic movement of the rams, a work supporting mechanism operable at the completion of each cycle of movement of the rams for retracting the finished work piece from the ram passing through the idle stroke and advancing an unfinished work piece to the ram passing through the cutting stroke, control means operable to secure each work piece to the work supporting means, and means operable with the last mentioned means for stopping the movement of the rams at the completion of a given cycle of movement unless the control means are in work securing adjustment.

6. In a broaching machine of the class described the combination of a first ram, a second ram, means for simultaneously actuating said rams, one through a cutting stroke while the other is being actuated through an idle stroke, hydraulic means for effecting the cyclic movement of the rams, a work supporting mechanism operable at the completion of each cycle of movement of the rams for retracting the finished work piece from the ram passing through the idle stroke and advancing an unfinished work piece to the ram passing through the cutting stroke, means operable to secure each work piece to the work supporting means, means operable with the last mentioned means for stopping the movement of the rams at the completion of a given cycle of movement unless the work pieces are properly secured to the work supporting mechanism, and means for preventing the operation of the work securing means until the work supporting means has been retracted a given amount from the broach ram.

7. In a broaching machine of the class described the combination of a pair of broach rams, means for effecting a continuous cyclic movement of said rams through a cutting and an idle stroke, an oscillatable work supporting table for supporting a work piece for each ram and operable at the conclusion of each cycle of operation of the rams, means for securing each work piece to the oscillatable work table, means operable with the last mentioned means for automatically stopping the cyclic operation of the rams unless the work pieces are properly secured to the table, including a valve in the hydraulic circuit for interrupting the flow therethrough, and a single means for actuating the work securing means and valve.

8. In a broaching machine the combination of a pair of broaching rams each adapted to be actuated through a cutting stroke while the other is passing through an idle stroke, the movements of the rams constituting a complete cycle during which a work piece is machined, automatic means for effecting a continuous repetition of said cycle, an oscillatable work table adapted to support a pair of work pieces, one for each of said rams and for presenting the work pieces to the ram passing through its cutting stroke, a work supporting fixture for each work piece on the table, power operated means for securing each work piece in its fixture, and means operable with the work securing means for interrupting the continuous repetition of the cycle and stopping the ram at the end of the cycle when the securing means are released.

9. In a broaching machine the combination of a pair of broaching rams each adapted to be actuated through a cutting stroke while the other is passing through an idle stroke, the movements of the rams constituting a complete cycle during which a work piece is machined, automatic means for effecting a continuous repetition of said cycle, an oscillatable work table adapted to support a pair of work pieces, one for each of said rams and for presenting the work pieces to the ram passing through its cutting stroke, a work supporting fixture for each work piece on the table, power operated means for securing each work piece in its fixture, means operable with the work securing means for interrupting the continuous repetition of the cycle and stopping the ram at the end of the cycle when the securing means are released, and means for effecting the oscillation of the work supporting table at the conclusion of each cycle of the machine.

10. In a broaching machine the combination of a pair of broaching rams each adapted to be actuated through a cutting stroke while the other is passing through an idle stroke, the movements of the rams constituting a complete cycle during which a work piece is machined, automatic means for effecting a continuous repetition of said cycle, an oscillatable work table adapted to support a pair of work pieces, one for each of said rams and for presenting the work pieces to the ram passing through its cutting stroke, a work supporting fixture for each work piece on the table, power operated means for securing each work piece in its fixture, means operable with the work securing means for interrupting the continuous repetition of the cycle and stopping the ram at the end of the cycle if the work pieces are not securely clamped in their work fixtures, means for effecting the oscillation of the work supporting table at the conclusion of each cycle of the machine, and means preventing the operation of the work supporting fixtures until the work piece being operated upon has been retracted a given distance from the ram.

11. In a broaching machine of the class described the combination of a pair of broach rams each operable through a cutting stroke while the other is operable through an idle stroke, an oscillatable work supporting table, a first work fixture secured to the table for presenting a work piece to one of said rams, a second work fixture secured to the table for presenting a work piece to the other ram, each of said work fixtures including power operated means for securing the work therein, means for oscillating the table, means for effecting the reciprocation of the rams, means operable by the rams for energizing the table oscillating means, and means operable to prevent the oscillation of the table unless each work fixture is in a work clamping position.

12. In a broaching machine of the class described the combination of a pair of reciprocating broach tools each adapted to be actuated through a cutting stroke and an idle stroke, an oscillatable work supporting table for presenting a work piece to said rams during a cutting stroke, a work supporting fixture on said table for each work piece, power means for securing a work piece in the fixture, individual controls for the power means of the respective fixtures, automatic means for actuating the rams and oscillating the table, and means associated with the controls for stopping the oscillation of the table if a control is in releasing position.

13. In a broaching machine of the class described the combination with a pair of reciprocating broach rams, of means for actuating said rams respectively through a cutting and an idle stroke, hydraulic means for actuating the rams including a hydraulic circuit and a piston associated with each ram, a table oscillatably mounted adjacent said rams and adapted to support a pair of work fixtures, one for each ram, hydraulic means for oscillating the table, valve means operable by the rams for initating the oscillation of the table, valve means operated by the table for initiating the movement of the rams, and additional valve means associated with the fixture operating means for interrupting the circuit and stopping the oscillation of the table unless a work piece is secured in the fixture.

14. In a broaching machine of the class described the combination of a pair of reciprocating broach rams, each ram adapted to be alternately actuated through a cutting stroke, an indexable table operable between a loading position and a cutting position for presenting a work piece to each ram prior to its movement through a cutting stroke, a work fixture for each work piece on said table, means for securing the work in its fixture, means for indexing the table, and means operable by the work clamping means for preventing the indexing of the table when the securing means are in work releasing adjustment.

15. In a broaching machine of the class described the combination of a pair of reciprocating broach rams, each ram adapted to be alternately actuated through a cutting stroke, an indexable table operable betwen a loading position and a cutting position for presenting a work piece to each ram prior to its movement through a cutting stroke, a work fixture for each work piece on said table, means for securing the work in its fixture, means for indexing the table, means operable by the work clamping means for stopping the indexing of the table unless a work piece is securely clamped in its fixture, and means operable by the table for continuing the indexing of the table upon the operation of the work clamping means.

16. A duplex broaching machine including a bed, a pair of broach rams movable on the bed in opposition one to the other, work supporting means having portions individual to each ram for presentation of a work piece to the ram during the broaching stroke thereof, means for shifting the work support means to retract same with respect to the ram during the non-tooling stroke thereof, means for effecting power clamping of the work by the work supporting means, a manual control for said power clamping, and means operable by said manual control for interrupting operation of the broach when the manual control is in work releasing position.

17. A duplex broaching machine including a bed, a pair of broach rams movable on the bed in opposition one to the other, work supporting means having portions individual to each ram for presentation of a work piece to the ram during the broaching stroke thereof, means for shifting the work support means to retract same with respect to the ram during the non-tooling stroke thereof, means for effecting power clamping of the work by the work supporting means, a manual control for said power clamping, means operable by said manual control for interrupting operation of the broach when the manual control is in work releasing position, and means preventing releasing movement of the manual control when the individual work holding means is in operative relation to its ram.

18. A duplex broach including a bed, a pair of vertically reciprocating broach rams carried thereby, broaching means operable by the rams, work supporting means alternately movable toward and from the respective rams, each of said work supporting means including a manually actuable work clamping mechanism, means for effecting continuous cyclic movements of the parts including alternate presentation of the respective work piece holders to their individual broaching rams and successive broaching movements of the rams with respect to their associated work piece holders, means operable by the manual clamp control when in work releasing position for interrupting the cycle of movement of the parts, and means for preventing actuation of the manual control when an individual work piece holder is in operative relation to its ram.

19. A duplex broaching machine of the character described including a bed or support, a pair of broaching rams carried thereby and alternately shiftable through a broaching stroke, means for effecting movement of the rams, an oscillatable work supporting table having work supports individual to the respective rams, means for effecting an oscillation of the table to present one or the other of the work supports to its associate ram during the tooling movement of the ram, means including an hydraulic circuit for effecting successive movements of the rams and work supports in predetermined cycle, individual manually controllable means for clamping and unclamping the work piece in the respective supports, a stop valve in the hydraulic circuit, and individual operating connections from the respective clamp controls to the valve for shifting the valve into stop position for interruption of the cycle when either of the individual control means is shifted to work releasing position.

20. A duplex broaching machine of the character described including a bed or support, a pair of broaching rams carried thereby and alternately shiftable through a broaching stroke, means for effecting movement of the rams, an oscillatable work supporting table having work supports individual to the respective rams, means for effecting an oscillation of the table to present one or the other of the work supports to its associate ram during the tooling movement of the ram, means including an hydraulic circuit for effecting successive movements of the rams and work supports in predetermined cycle, individual manually controllable means for clamping and unclamping the work piece in the respective supports, a stop valve in the hydraulic circuit, individual operating connections from the respective clamp controls to the valve for shifting the valve into stop position for interruption of the cycle when either of the individual control means is shifted to work releasing position, and means for reversely shifting the stop valve when the work has been clamped.

ERWIN G. ROEHM.